United States Patent [19]

Beecher

[11] 3,985,421

[45] Oct. 12, 1976

[54] BINOCULAR HAVING SMALL SIZE, LIGHTWEIGHT, AND HIGH PERFORMANCE CHARACTERISTIC

[76] Inventor: William J. Beecher, 1960 Lincoln Park West, Chicago, Ill. 60614

[22] Filed: Mar. 10, 1975

[21] Appl. No.: 556,737

Related U.S. Application Data

[63] Continuation-in-part of Ser. No. 312,022, Dec. 4, 1972, abandoned.

[52] U.S. Cl. ................................ 350/36; 350/72; 350/76
[51] Int. Cl.² ...................... G02B 23/02; G02B 7/06
[58] Field of Search ................. 350/36, 72, 75, 76, 350/77

[56] References Cited
UNITED STATES PATENTS

| 1,283,815 | 11/1918 | Lamphier | 350/72 |
| 1,397,156 | 11/1921 | Baumann | 350/36 X |
| 1,480,821 | 1/1924 | Henry | 350/72 |
| 2,424,283 | 7/1947 | Miles | 350/36 X |
| 2,710,560 | 6/1955 | Thompson | 350/72 X |
| 3,298,770 | 1/1967 | Rosendahl | 350/36 |

FOREIGN PATENTS OR APPLICATIONS

| 973,186 | 9/1950 | France | 350/76 |
| 269,445 | 1/1914 | Germany | 350/76 |

*Primary Examiner*—David H. Rubin
*Attorney, Agent, or Firm*—Norman H. Gerlach

[57] ABSTRACT

A high performance binocular which, by accurately seating and housing four lightweight mirrors of each telescope in a lightweight shell that almost exactly encloses its extremely short optical system, results in an optical instrument which is much smaller and approximately eight times lighter than a conventional or standard prism-type binocular having the same optical characteristics. A novel positioning of the four mirrors within each telescope shell of the binocular serves to fold the optical space within such shell so that there is minimum mirror overlap along the direction of sight, thus resulting in an instrument in which the eyepiece and objective apertures are nearly coplanar so that the eyepiece and objective barrels are collapsed toward each other with the result that they are appreciably withdrawn into the over-all confines of the telescope shells in order to produce an extremely short instrument.

10 Claims, 26 Drawing Figures

BINOCULAR HAVING SMALL SIZE, LIGHTWEIGHT, AND HIGH PERFORMANCE CHARACTERISTIC

This patent application is a continuation-in-part of my (now abandoned) U.S. patent application Ser. No. 312,022, filed on Dec. 4, 1972, and entitled "BINOCULAR HAVING SMALL SIZE, LIGHTWEIGHT, AND HIGH PERFORMANCE CHARACTERISTICS."

The present invention relates generally to optical instruments and has particular reference to a novel binocular which, by making use of the minimum weight potential of either a die cast metallic (magnesium) or a plastic binocular shell, and also substituting lightweight mirrors for heavy prisms, results in an instrument which is materially lighter than conventional or standard prism-type binoculars having the same optical rating. The invention is further concerned with such a binocular having the usual eyepiece and objective barrels, together with an erecting system consisting of four mirrors in each binocular half or telescope, the mirrors being constructed and so arranged in each telescope shell in Porro-one relationship that the converging light path of the optical system is closely confined by the shell without waste space. Still further, according to the present invention, the aforementioned mirrors in the two telescope shells fold the two optical systems in such a manner that the objective barrels are disposed immediately forwardly of the user's forehead and in close proximity thereto when the binocular is in use, thus resulting in an optical instrument which is of minimum longitudinal extent. This is made possible by folding the optical space within each binocular half or telescope so that there is a minimum of overlap of the mirrors within the telescope shell and along the line of sight, the folding being so effected that the objective aperture which is associated with the shell is shifted rearwardly to a point where it is nearly coplanar with the eyepiece aperture. This enables the eyepiece barrel of each telescope to be nested alongside that portion or "roof" of the associated shell which encloses a forward pair of adjacent mirrors, and it also enables the objective barrel of each telescope to be nested alongside that portion of the associated shell which encloses a rearward pair of adjacent mirrors. The objective barrels of the two binocular halves of telescopes being thus moved back toward the forehead of the user results in a binocular which projects only a small distance forwardly of the user's forehead.

The provision of a binocular such as has briefly been outlined above constitutes the principal object of the present invention. In carrying out this object, many of the inefficiencies of a conventional prism-type binocular, such, for example, as unnecessary bulk, undue weight, and wastefulness of glass have been alleviated. For example, with a prism-type binocular, the size of the prisms is dictated by the requirement of the first prism facet so that only a fraction of the remaining facets are actually used for light transmission purposes. This results in a material waste of space-consuming glass and greatly adds to the over-all weight and size of the instrument, to say nothing of the substantial amount of metal and space which must be devoted to seating of the prisms. According to the present invention, the mirror-erecting system of each telescope of my improved binocular employs a sequential series of mirrors embodying mirror outlines which decrease progressively in size so that each mirror exactly accommodates the light bundle which is applied thereto with substantially no excess peripheral mirror areas which would add to the size of the instrument as a whole.

Insofar as viewing through the present binocular is concerned, prolonged viewing for wild life study, air search, and spectator sports involving rapid position changes are contemplated. Whether the binocular be hand-held or spectacle-mounted, such strainless viewing is attained by the provision of an optical system wherein only the relatively small eyepiece barrels are disposed in front of the eyes when viewing objects. The first eye lenses of these eyepiece barrels are relatively small and they are virtually devoid of a surrounding rim, while at the same time the eyepiece barrel is relieved on a frusto-conical bias so that the eyes may see both through and around the instrument simultaneously with no trace of the opaque peripheral framing ring or band which is common to conventional prism-type or other binoculars.

The provision of a high performance binocular which is relatively simple in its construction and, therefore, may be manufactured at a relatively low cost; one which is comprised of a minimum number of parts, particularly moving parts and, therefore, is unlikely to get out of order; one which is rugged and durable and, therefore, will withstand rough usage; one which is capable of ease of assembly and in which the mirrors thereof are cemented in place in order to inhibit or prevent ready dismantlement; one which is attractive in its appearance and pleasing in its design, are further desirable features which have been borne in mind in the production and development of the present invention.

Other objects and advantages of the invention, not at this time enumerated, will readily suggest themselves as the nature of the invention is better understood from a consideration of the following detailed description.

The invention consists in the several novel features which are hereinafter set forth and are more particularly defined by the claims at the conclusion hereof.

In the accompanying four sheets of drawings forming a part of this specification, one illustrative embodiment of the invention is illustrated in detail.

In these drawings.

Referring now to the drawings in detail and in particular to FIGS. 1 to 4, inclusive, these figures are drawn to full scale and illustrate generally the external configuration of a binocular embodying the principles of the present invention, such binocular being identified by the reference numeral 10. As is customary in connection with conventional binoculars of the type under consideration, the binocular 10 is comprised of two counterpart telescopes 12 and 14, the telescope 12 as viewed in FIG. 1 being designed for viewing cooperation with the user's left eye and the telescope 14 as viewed in FIG. 1 being designed for viewing cooperation with the user's right eye. In the following description, as well as in the appended claims, reference to the binocular 10 insofar as is practicable will be made on the basis of the position which it assumes in FIG. 1. So far as the present patent application is concerned, that part of the binocular which includes the eyepiece barrels 16 will be considered as the front of the binocular and that part which includes the objective barrels 18 will be considered as the rear of the binocular. In such figure, the binocular is shown in its horizontal viewing position with the two tubular eyepiece barrels 16 and the two objective barrels 18 extending horizontally and with the two eyepiece barrels disposed in a horizontal plane below the horizontal plane of the two objective barrels. Furthermore, since the two telescopes 12 and 14 are substantially identical except insofar as they are complementary structures and differ from each other only by the use of components which are "mirror complements," a description of one telescope will suffice largely for the other. The two telescopes 12 and 14 are connected together by a hinge connection 20 the nature of which will be made clear presently.

Each telescope involves in its general organization a series of four mirrors or reflectors M1, M2, M3 and M4, these mirrors being arranged in Porro-one fashion at mutual right angles and also supported in a unitary housing-forming shell 22 (see FIGS. 17, 17a, 17b, 18, 18a and 18b). Said shell serves fixedly to support the associated eyepiece barrel 16 and also rotatably to support the associated objective barrel 18. In addition, it forms a foundation for an external covering or skin 23. Generally speaking, each shell 22 is of frame-like design as shown in FIGS. 6 to 9 of the drawings.

The two frame-like shells 22 are connected together by the aforementioned hinge connection 20 and, when so connected, constitute the articulated binocular framework. Each shell is preferably formed of die cast magnesium although other suitable materials are contemplated and may be employed if desired.

The mirrors M1, M2, M3 and M4 are planar and in the exemplary form of the invention they are constructed of glass-laminated magnesium although it is within the purview of the invention to construct them entirely of plastic, or glass or metal, or a laminated combination of the last two mentioned materials. Irrespective, however, of the particular material of which the mirrors are formed, the particular function of such mirrors is the same or always preserved. As will be described more in detail hereafter, the four aforementioned mirrors are generally horseshoe-shaped.

Figure 5:
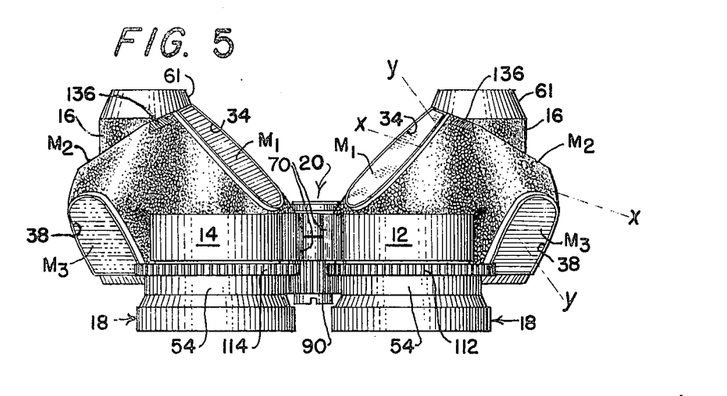
FIG. 5 is a top plan view of the binocular.
Figures 6, 7:
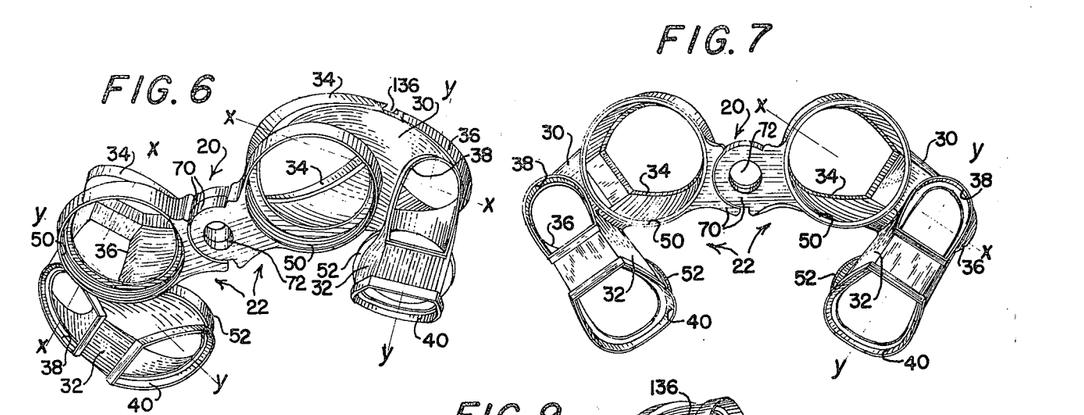
FIG. 6 is a rear perspective view of the two-part basic and assembled articulated binocular shell, such view being viewed obliquely from above and for purposes of clarity being devoid of the lenses, mirrors and related parts which are normally mounted in the shell.
FIG. 7 is a direct rear perspective view of the binocular shell.
Figures 8, 9:
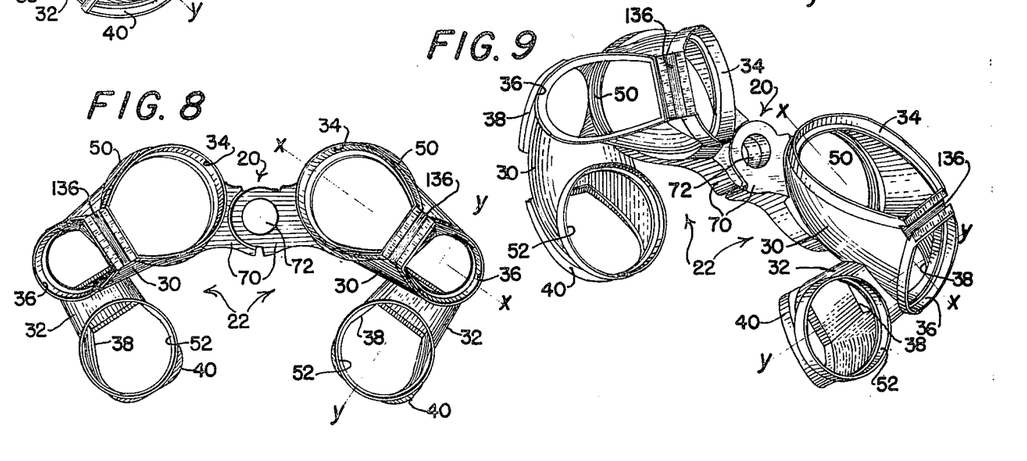
FIG. 8 is a direct front perspective view of the binocular shell.
FIG. 9 is a front perspective view of the binocular shell as viewed obliquely from below.

The geometry or specific configuration of the frame-like shells 22 is best illustrated in FIGS. 6 to 9, inclusive, where it will be observed that each shell, as previously indicated, is of unitary construction and embodies a lightweight magnesium or other metal or plastic framework which is of complex contour and presents or consists of two somewhat bulbous generally tubular and slightly tapered upper and lower shell portions 30 and 32 (see FIG. 6). Such shell portions extend at right angles to each other and intersect and communicate at adjacent ends. The axes of the shell portions 30 and 32 are shown in FIGS. 5 to 9 by the dotted lines x—x and y—y, respectively. Generally speaking, the shell portions 30 and 32 of each shell 22 are nearly tangential at the region where they cross each other, there being a slight amount of intersection between these two hollow portions so that there is communication between them at their region of approximate tangency. The upper shell portions 30 are disposed in a substantially horizontal plane and extend from the binocular rear both outwardly and forwardly. The lower shell portions extend substantially vertically and extend downwards from the front outer ends of the upper shell portions.

Referring now to FIGS. 6 to 9, inclusive, it will be observed that the tubular shell portions 30 and 32 of each shell 22 are open at their ends and that the front portion of the inner end portion of the upper shell portion 30 is shaped to form a forwardly and inwardly facing flange-like horseshoe-shaped seating aperture 34 which has the mirror M1 mounted therein and has its axis extending at a 45° angle with respect to the longitudinal axis x—x of said upper shell portion 30. The outer front end portion of the upper shell portion 30 terminates in a forwardly and outwardly facing flange-like horseshoe-shaped seating aperture 36 which has the mirror M2 mounted therein and has its axis at a 45° angle with respect to said axis x—x of the upper shell portion 30. The upper end portion of the vertically extending lower shell portion 32 of each shell 22 terminates in an upwardly and rearwardly facing flange-like horseshoe-shaped, seating aperture 38 which has the mirror M3 mounted therein and has its axis at a 45° angle with respect to the axis y—y of said lower shell portion 32. The lower end portion of said lower shell portion 32 is shaped to form a rearwardly and downwardly facing flange-like horseshoe-shaped, seating aperture 40 which has the mirror M4 mounted therein and has its axis at a 45° angle with respect to the vertically extending axis y—y of said lower shell portion 32. As shown in the drawings, the mirror-seating apertures 34 and 36 are disposed in opposed relation and at right angles to one another, the mirror-seating apertures 36 and 38 are disposed in opposed relation and at a 45° angle with respect to one another, and the mirror-seating apertures 38 and 40 are disposed one over the other and at right angles to one another. Preferably the mirrors are cemented in their respective apertures in order to prevent ready dismantlement of the binocular as a whole. In view of the fact that the mirror-seating apertures 34, 36, 38 and 40 are horseshoe-shaped each of them embodies an arched rim section and a straight rim section. The mirrors M1, M2, M3 and M4 are shaped correspondingly to their respective horseshoe-shaped seating apertures and, therefore, they too each embody an arched rim section and a straight rim section.

Still referring to the construction of the two frame-like shells 22 of FIGS. 6 to 9, inclusive, in conjunction with the binocular disclosure of FIG. 5, the aforementioned objective barrels 18 are rotatably and threadedly supported in circular apertures 50 which are formed in the rear inner end portions of the upper shell portions 30, face rearwards and are disposed in opposed relation with respect to the horseshoe-shaped seating apertures 34 for the mirrors M1. The axes of the circular apertures 50 extend at a 45° angle with respect to the mirrors M1 and at right angles to the axes x—x of the upper shell portions 30. The axes of the circular apertures 50 are also disposed in parallel relation with and close proximity to the hinge connection 20 as clearly shown in FIGS. 6 and 7. The eyepiece barrels 16 of the binocular 10 are fixedly supported in circular apertures 52 which, as best shown in FIGS. 6, 8, 9 and 18 of the drawings, are formed in the lower end portions of the lower shell portions 32, face directly forwards and are disposed in opposed relation with respect to the mirrors M4 in the seating apertures 40. The axes of the circular aperture 52 extend at a 45° angle with respect to said mirrors M4 and at right angles to the longitudinally and vertically extending axis y—y of the lower shell portion 32.

Considering each frame-like shell 22 with its four mirrors M1, M2, M3 and M4 disposed in their respective seating apertures 34, 36, 38 and 40 and with its objective barrel 18 and eyepiece barrel 16 disposed in their respective circular apertures 50 and 52, light emanating from a distant source outside of the binocular 10 first enters the upper shell portion 30 via the objective barrel 18, then travels towards the front portion of the binocular and impinges against the mirror M1, then is deflected laterally and at right angles by the mirror M1 and travels outwardly through the upper shell portion 30, then impinges against the mirror M2 and is deflected at right angles by the latter so that it travels rearwards towards the mirror M3, then impinges against said mirror M3 and is deflected downwards through the lower shell portion 32, then strikes the mirror M4 and is deflected at right angles by the latter so that it travels forwards and lengthwise through the eyepiece barrel 16 in the circular aperture 52.

Figure 16:
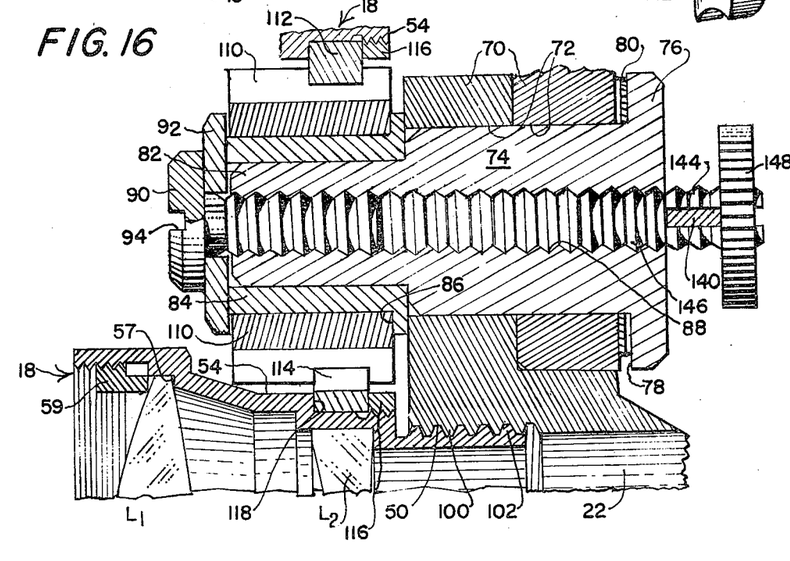
FIG. 16 is an enlarged vertical sectional view taken substantially along the line 16—16 of FIG. 12, the adjacent objective barrel being also in section.
Figures 17, 17A, 17B, 18, 18A, 18B, 19:
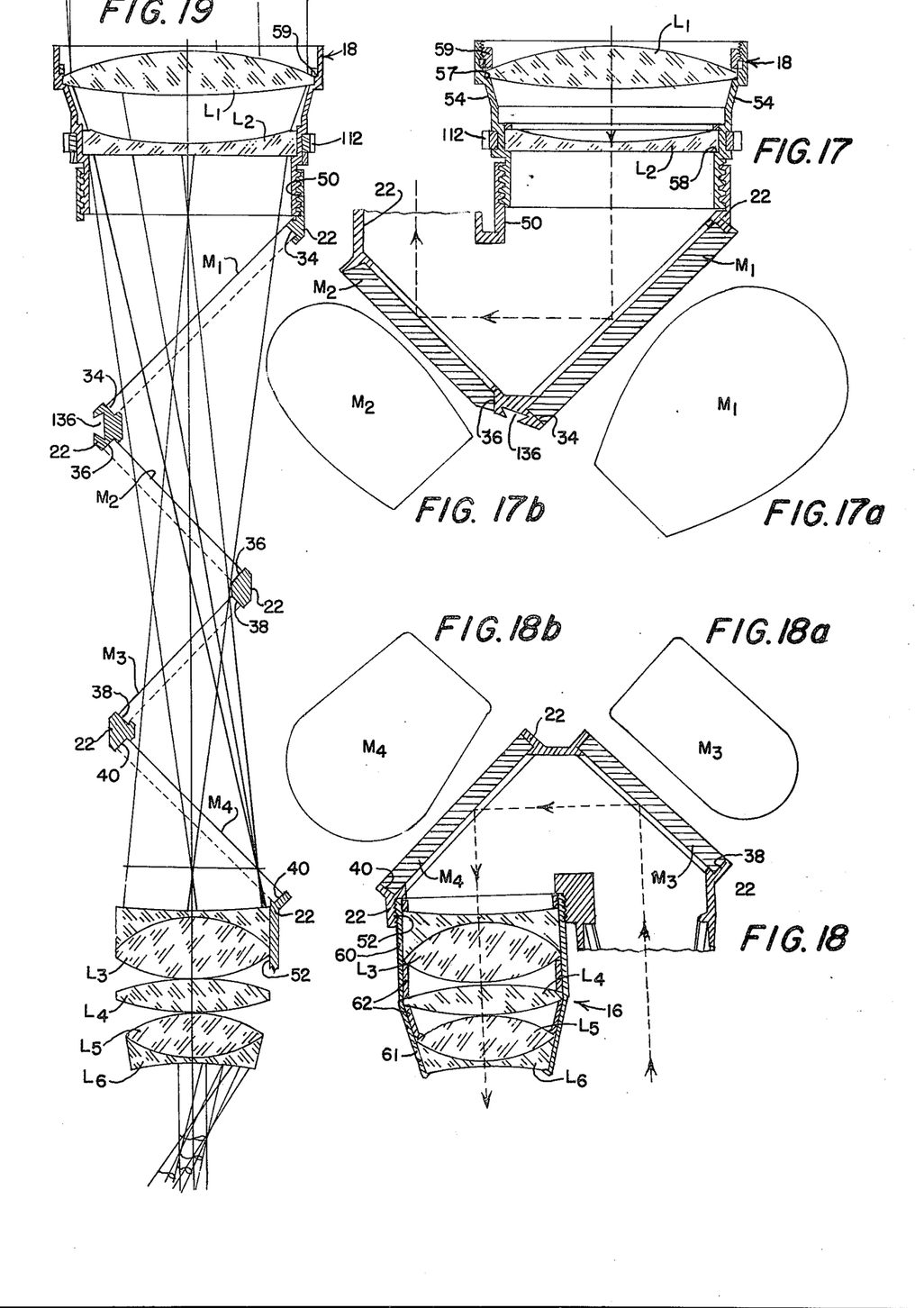
FIGS. 17 and 18 are positionally arranged sectional views which are largely schematic in their representation and are taken generally on the lines 17—17 and 18—18, respectively, of FIG. 4, the two views when considered collectively illustrating the central path of light through the binocular.
FIGS. 17a, 17b, 18a and 18b are face views of four mirrors which are employed in connection with the invention and which appear in FIGS. 17 and 18, the mirrors being positioned in the drawings alongside their respective mirror disclosures of FIGS. 17 and 18.
FIG. 19 is a developed longitudinal sectional-type diagram of the unfolded optical system of one binocular half or telescope and illustrating the manner in which bundles of light pass through such telescope.

As previously stated, the longitudinally adjustable objective barrels 18 are fixedly mounted in their respective mounting apertures 50, the details of construction of the left-hand objective barrel being illustrated in FIG. 17. Such barrel, as well as the right-hand objective barrel of the binocular 10, is in the form of a self-contained lens holder assembly including a generally cylindrical rotatable tubular casing 54. The latter has an outer inside annular ledge support 57 for a double convex lens L1 and an inner inside annular ledge support 58 for a plano-concave lens L2 the two lenses being air-spaced from each other. The lens L1 is held in position by a retaining ring 59 which is threadedly received in the outer end of the casing 54 as shown in FIGS. 16 and 17, while the lens L2 may be bonded in position on the ledge support 58 by way of any suitable adhesive. The manner in which the objective barrels of the two telescopes 12 and 14 of the binocular 10 are capable of being rotated will be described in detail subsequently.

The eyepiece barrels 16 are fixedly mounted in their respective circular apertures 52 as previously pointed out. The left-hand eyepiece barrel is shown in detail in FIG. 18 and it, as well as the right-hand eyepiece barrel, is in the form of a self-contained lens holder assembly which includes a tubular casing 60 having a frusto-conical outer or front end 61. Said casing encloses a series of five lenses, namely, an inner achromat consisting of an outer double convex lens L3 in bonded relation with an inner double concave lens (not numbered), an intermediate double convex lens L4, and an outer achromat consisting of an inner convex lens L5 in bonded relation with an outer double concave lens L6. These lenses are serially arranged within the casing 60 successively in the order named. Spacer rings 62 serve to maintain the various lenses in their proper positions within the casing 60, the lens L6 having a frusto-conical outer surface which fits against the inside surface of the outer or front end of the casing 60.

The circular apertures 52 are interiorly threaded and the inner or rear ends of the casings 60 of the eyepiece barrels 16 are threadedly received within the apertures 52 with a tight fit which is intended to be permanent except for possible removal of the barrels 16 for lens replacement of cleaning purposes.

The specific character per se of the eyepiece barrels 16 and the objective barrels 18 constitute no part of the present invention as claimed except insofar as their cooperation with the various mirrors M1, M2, M3 and M4 is concerned. It is deemed sufficient for purposes of description herein to state that for the illustrated exemplary 8 × 30 mm. 8 inches binocular, ideal results are attained when the over-all focal length of the lenses in each eyepiece barrel 16 is on the order of 13.54 mm. and the focal length of the lenses in each objective barrel 18 is on the order of 101.88 mm., the eyepiece barrels presenting wide-angle characteristics on the order of 64°.

It is to be noted at this point that the aforementioned apertures 52 which receive the eyepiece barrels 16 and which, therefore, may be logically referred to as the "eyepiece apertures," are disposed with respect to the line of sight in a transverse plane which is only slightly forwardly displaced from the apertures 50 which receive the objective barrels 18 and which, therefore, may logically be referred to as the "objective apertures." These two apertures may thus be said to be nearly coplanar and this relationship between them is, to a large extent, responsible for the extreme shortness of the binocular as will be described in considerable detail presently.

Figure 10:
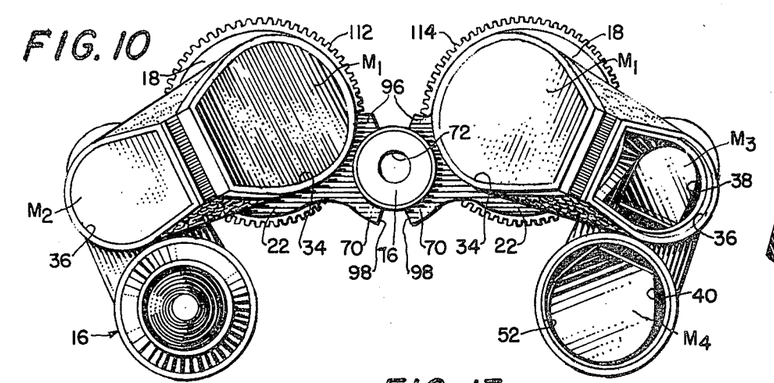
FIG. 10 is an enlarged front elevational view similar to FIG. 1 but with the right side mirror and eyepiece removed in order to reveal internal structure.
Figure 11:
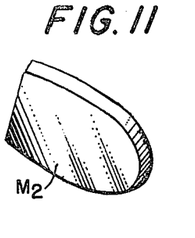
FIG. 11 is a perspective view of one of the horseshoe-shaped mirrors which are employed in connection with the invention.
Figures 12, 13, 14, 15, 15A:
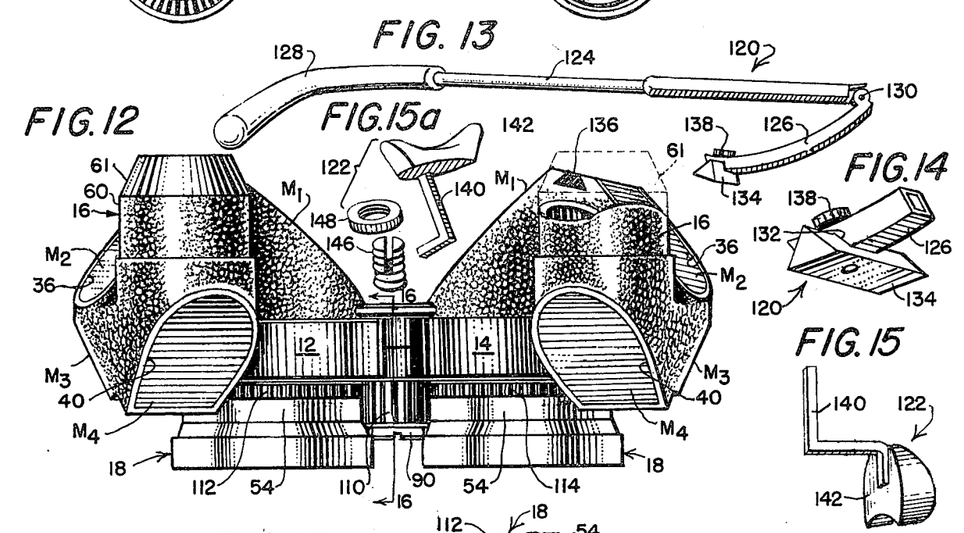
FIG. 12 is an enlarged bottom plan view similar to FIG. 2 but with one eyepiece broken away.
FIG. 13 is a perspective view of one of the detachable earpiece assemblies which are employed in connection with the invention.
FIG. 14 is an enlarged fragmentary perspective view of one of the dovetail connections by means of which the earpiece assemblies are removably secured to the binocular shell.
FIG. 15 is an enlarged perspective view of the nosepiece assembly of the improved binocular constituting the present invention.
FIG. 15a is an exploded perspective view of the nosepiece assembly of FIG. 15 and is associated attachment means.

Referring again to FIGS. 1 to 5, inclusive, and additionally to FIGS. 10, 12 and 16, the two frame-like shells 22 of the binocular 10 are provided with cooperating and complementary hinge lugs 70 of similar construction, each hinge lug being formed integrally with and projecting inwardly and laterally from the rear inner end region of the tubular upper shell portion of the associated shell 22. The two hinge lugs 70 overlap each other as clearly shown in FIG. 6 and have formed therein coaxial holes 72 which receive therethrough a stepped hinge pin 74 (see FIG. 16) by means of which the two shells 22 are hingedly connected together. The rear end of the hinge pin 74 is provided with an integral outwardly extending annular flange 76 which defines a forwardly or inwardly facing annular shoulder 78. The latter opposes the rear side face of the adjacent hinge lug 70 and serves to prevent forward displacement of the hinge pin 74. A friction washer 80 of the undulatory or wavy type is interposed between the flange 76 and the opposed side face of the adjacent hinge lug 70 and functions in a manner and for a purpose that will be made clear presently.

The front end of the hinge pin 74 is in the form of a reduced extension 82 on which there is mounted a flanged bushing 84. The flange of such bushing is located at the inner end of the bushing and extends outwards. The front face of said flange defines a rearwardly facing shoulder 86, the purpose of which will be set forth hereafter. The hinge pin 74 and its extension 82 are provided with an axially extending coextensive threaded bore 88, the front end of which receives therein a clamping screw 90. The latter, when tightened in the bore 88, bears against a washer 92 so that the latter forces the bushing 84 rearwardly (i.e., to the right as seen in FIG. 16) against the front side face of the adjacent hinge lug 70, thus compressing the friction washer 80 against the flange 76 and also urging and compressing the two hinge lugs tightly together. The clamping screw 90 is provided with a kerf 94 in order to facilitate turning thereof so that the degree of compression between the two hinge lugs may be varied at will. By such an arrangement, the pivotal or "bending" action between the two shells 22, and consequently, the two telescopes 12 and 14, may be regulated insofar as frictional resistance is concerned. It will be understood, of course, that this pivotal or "bending" action between the two binocular halves is provided for the purpose of adjusting the interpupillary distance between the eyepiece barrels 16. It will be further understood that the selected interpupillary distance will be frictionally retained as soon as the bending torque which is applied by the user in connection with binocular adjustment is relieved.

Figure 1:
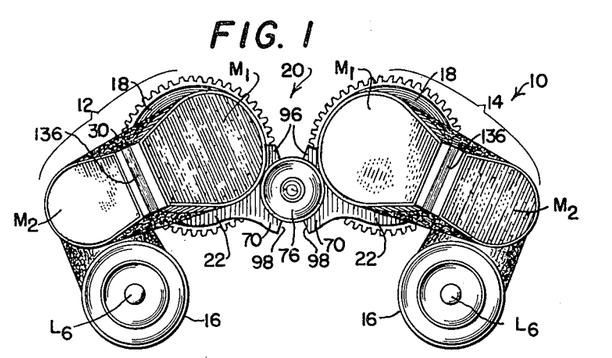
FIG. 1 is a front elevational view of a binocular embodying the principles of the present invention, such view illustrating the improved binocular in the operative viewing position in which it is held by the user.
Figure 2:
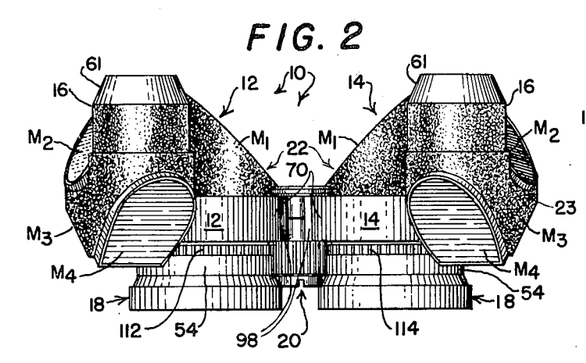
FIG. 2 is a bottom plan view of the binocular.
Figure 3:
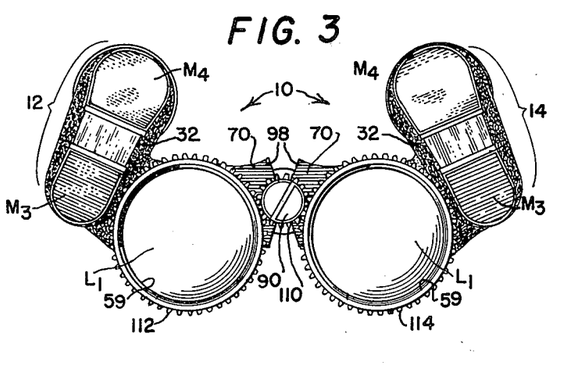
FIG. 3 is a rear elevational view of the binocular.
Figure 4:
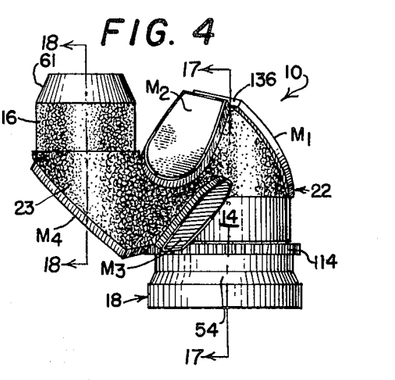
FIG. 4 is a right side elevational view of the binocular.

As best shown in FIGS. 1, 3 and 10, a pair of coacting upper stop shoulders 96 are formed on the two hinge lugs 70 and, when these shoulders move into abutting relationship in connection with pivotal adjustment of the two binocular halves, the maximum interpupillary distance of which the binocular is capable of assuming is attained. Similarly, a pair of coacting lower stop shoulders 98 on the hinge lugs 70 determine the minimum interpupillary adjustment of the binocular 10.

According to the present invention, means are provided for effecting center focusing (simultaneous correlated focusing) of the two counterpart telescopes 12 and 14 of the binocular or alternatively effecting focusing of either telescope independently of the other telescope. Accordingly, and as best illustrated in FIG. 16, each aperture 50 is provided with a multiple start internal screw thread 100 and it is designed for threaded engagement with an external screw thread 102 on the casing 54 of the associated objective barrel 18. Simultaneous focusing of the two telescopes 12 and 14, i.e., center focusing of the binocular as a whole, is accomplished by rotating either objective barrel 18 as the case may be, the two objective barrels being frictionally geared to each other for rotational movement in unison by means of an idler pinion 110 which meshes with gears 112 and 114, the latter being concentrically mounted respectively on the casings 54 of the two objective barrels 18 with a sliding frictional fit in a manner that will be set forth presently. The idler pinion is rotatably mounted on the aforementioned flanged bushing 84 and is loosely confined against longitudinal or axial shifting between the flange of said bushing and the washer 92.

In order to place a moderate degree of frictional restraint on each of the two objective barrels 18, the gears 112 and 114 are in the form of gear rings which encompass the casings 54 of the barrels 18 and have annular series of external teeth. These gear rings are circumferentially slidable on the casings 54 so that relative rotation between each gear ring and its associated objective barrel 18 is possible but a degree of frictional restraint is placed upon such relative motion by means of friction nuts 116 which are threadedly received on the casings 54 of the objective barrels 18, frictionally engage the rear side faces of the two gear rings, and force the latter forwardly against annular shoulders 118 on said casings 54. By adjusting the compression of the friction nuts 116 against the two gear rings, the desired degree of friction at the side faces of the latter may be attained thus restraining relative circumferential sliding movement between the two gear rings and their respective casings 54.

From the above description, it will be apparent that because both gear rings (112 and 114) are in meshing engagement with the intermediate idler pinion 110, manual rotation of either objective barrel 18 will effect commensurate rotation of the other objective barrel in the same direction. Since these objective barrels are each threaded in their respective apertures 50, the degree of threaded advance or threaded retraction of the barrels in their respective apertures 50 will be precisely the same, regardless of which barrel is selected for manual turning movement. In this manner, center focusing of the binocular 10 is readily attained.

Individual focusing of either objective barrel 18 to the exclusion of the other objective barrel is attained by the simple expedient of manually restraining one barrel against rotation while rotating the other barrel. Obviously, the barrel which is restrained will remain stationary so that it will neither advance nor retract within its aperture 50. On the other hand, rotation of the other objective barrel will take place as soon as torque is applied thereto by reason of the fact that although the idler pinion 110 is held stationary due to its meshing engagement with the stationary gear ring on the stationary objective barrel, and although its gear ring is held stationary due to its meshing engagement with the stationary pinion 110, the casing 54 of the objective barrel being rotated may slip since it is only frictionally restrained by its associated friction nut 116 which slides against the associated gear ring. Thus, it may be independently focused.

The present binocular 10 is provided with an auxiliary attachment by means of which it may be converted from a hand-held optical instrument to a spectacle-type instrument. Such attachments consist of a pair of earpiece assemblies 120 (only one of which is disclosed herein) and a nosepiece assembly 122. One of the earpiece assemblies 120 is shown in detail in FIGS. 13 and 14, while the nosepiece assembly 122 is shown in detail in FIGS. 15, 15A and 16.

Considering now the illustrated earpiece assembly 120, this assembly involves in its general organization an articulated ear-engaging strut including a distal rod section 124 and a proximate section 126, the former section being provided with a conventional curved ear-encircling hook 128 and the latter section being in the form of an arcuate anchor piece which is connected by a hinge-type joint 130 to the rod section 124. The free end of the anchor piece 126 is provided with a V-shaped slot 132 in which is mounted transversely a generally triangular anchor bar 134, the latter being suitably held in position within the slot by silver solder or the like. As shown in FIGS. 1, 5, 6, 8, 12, and 17, the frame-like shells 22 of the two telescopes 12 and 14 are provided with elongated dovetail slots 136 on the front portions of the tubular upper shell portions 30 at regions between the apertures 34 and 36, such slots being designed for adjustable and removable reception therein of the triangular anchor bars 134 of the earpiece assemblies 120. Clamping screws 138 extend through both the anchor rods 126 and the triangular anchor bars 134 and, when tightened, serve to clamp the latter securely within their respective dovetail slots 136 in any desired adjusted position.

The nosepiece assembly 122 is in the form of a Z-shaped bar 140 which is square in cross section and to one end of which there is secured a nosepiece pad 142. The other end region of the bar 140 is designed for removable reception in the outer slotted end 144 (see FIGS. 15A and 16) of a retaining screw 146 which is threadedly received in the front end of the aforementioned bore 88 in the hinge pin 74 and, when so received, a knurled circular nut 148 may be screwed over said slotted end 144 of the screw 146 so as to clamp the bar 142 in a fixed and operative position on the hinge pin.

The two earpiece assemblies 120 and the single nosepiece assembly 122 are counterpart assemblies which conjointly serve to maintain the binocular 10 in a convenient viewing position in front of the eyes of the viewer with a major portion of the binocular being positioned at forehead level. In other words, whether the binocular is held in the hands of the viewer, or whether it is supported by the earpiece and nosepiece assemblies 120, 122, the eyepiece barrels 16 will assume positions directly in front of the eyes of the viewer while the objective barrels 18 will be disposed close to and immediately in front of the viewer's forehead. The binocular 10 is thus possessed of an appreciable periscopic function.

The particular optical system which is illustrated herein, when considered per se, constitutes no part of the present invention as previously indicated. The references which have heretofore been made to the system consist largely in a description of the general shape characteristics of the various lenses L1, L2, L3, L4, L5 and L6 and the placement of the mirrors M1, M2, M3 and M4 within specifically positioned mirror-receiving apertures in the binocular shells 22, together with a general description of the placement of the various mirrors and lenses with respect to one another.

The aforementioned optical system, when embodied in the binocular shells 22 and combined with the mirror erecting system which has been previously described herein, results in a high performance binocular having a longitudinally shorter optical system than has heretofore been considered possible with binoculars employing either mirrors or prisms for erecting purposes. For example, in the unfolded longitudinal sectional diagram of FIG. 19, it will be observed that the four mirrors M1, M2, M3 and M4 of each telescope of the binocular 10 are arranged in Porro-one relationship in their respective shell 22 and that the latter is constructed so that it exactly encloses the light path of the optical system. Furthermore, the various mirrors are positioned in close edge-to-edge relationship throughout the erecting system with only sufficient framework metal between adjacent mirror edges to provide the necessary mirror support. For example, as shown in FIGS. 17 and 19, the linearly straight edges of the horseshoe-shaped mirrors M1 and M2 are separated by the small thickness of framework metal which exists between the small thickness of framework metal which exists between the mirror-supporting apertures 34 and 36 and, as shown in FIGS. 18 and 19, the linearly straight edges of the horseshoe-shaped mirrors M3 and M4 are separated by the small thickness of framework metal which exists between the mirror-supporting apertures 38 and 40. Also, as shown in FIGS. 6 and 19, the arcuate edges of the mirrors M2 and M3 are separated by a small thickness of metal which exists between the apertures 36 and 38.

As shown in FIGS. 17 and 19, the circular edges of the apertures 50 which receive the objective barrels 18 are positioned close to and in nearly tangential relationship with respect to the arched edges of the apertures 34 which receive the mirrors M1. Similarly, as shown in FIGS. 6 and 18, the circular edges of the apertures 52 which receive the eyepiece barrels 16 are positioned close to and in nearly tangential relationship with respect to the arched edges of the apertures 40 which receive the mirrors M4.

The attainment of binocular shortness as compared with conventional binoculars is largely a result of a novel placement of the mirrors M1, M2, M3 and M4 so that the mirrors M3 and M4 assume positions alongside each objective barrel 18, while the mirrors M1 and M2 assume positions alongside each eyepiece barrel 16. This is accomplished by folding the optical system of each telescope further forwardly than is the case of conventional binoculars. Reference to the schematic views of FIGS. 20 and 21 of the drawings for comparison purposes will illustrate the particular involved principle.

Figure 20:
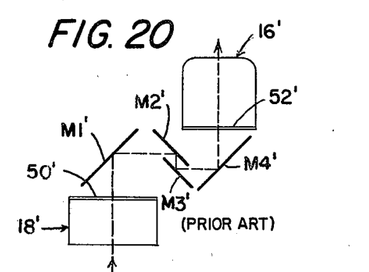
FIG. 20 is a diagrammatic view, entirely schematic in its representation, showing the manner in which the optical space within a conventional binocular telescope is folded to produce an inordinate amount of mirror overlap.

In FIG. 20 wherein mirror placement in connection with a conventional four-mirror binocular telescope is schematically portrayed, the eyepiece aperture 52' is rearwardly of the objective aperture 50' by an appreciable distance. This brings the mirrors M2' and M3' into partial overlapping relationship with respect to the line of sight and it brings the mirrors M1' and M4' into complete overlapping relationship. The mirrors M2' and M3' assume overlapping positions close to each other so that the path of light entering and passing through the telescope strikes the mirror M1', proceeds transversely to the mirror M2' and then makes a very short forward jog to the mirror M3', after which it passes to the mirror M4' and then is directed rearwardly through the eyepiece barrel. This separates the eyepiece and objective barrels 16' and 18' by an appreciable longitudinal extent and the telescope is necessarily relatively long. Both of the barrels 16' and 18' "stand out" so to speak and project from the telescope shell proper, the barrels 16' rearwardly and the barrels 18' forwardly.

Figure 21:
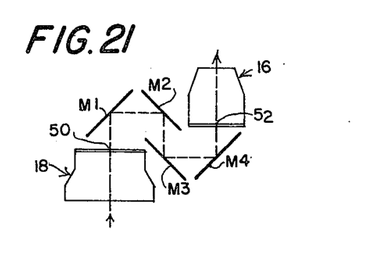
FIG. 21 is a diagrammatic view, similar to FIG. 20 but showing the manner in which the optical space within one binocular telescope of the present invention is folded to produce minimum mirror overlap.

In FIG. 21 wherein mirror placement in accordance with the present invention is schematically portrayed, an early forward folding of the system of each telescope places the eyepiece aperture 52 and the objective aperture 50 in nearly the same common transverse place of the telescope. This eliminates any overlapping whatsoever of the mirrors M2 and M3 while there is only a minimal overlapping (practically negligible) of the mirrors M1 and M4. The light passing through the telescope makes a long forward jog between the mirrors M2 and M3 and, because of this, the mirrors M3 and M4 are able to be, and in fact are, positioned alongside the eyepiece barrel 16. Such mirror placement, coupled with the tangential arrangement of certain of the mirrors as previously described, results in a binocular telescope which as a whole is extremely shallow or short.

In the use of the herein described binocular 10, initial focusing of the instrument may be attained by a sighting procedure wherein the user, with the instrument held in a viewing position, closes either eye and sights a distant object with the other eye. By rotating the objective barrel 18 of the telescope which is thus being used for sighting purposes, this telescope may be brought into proper focus. During this procedure, rotation of the one objective barrel will serve to drive the other objective barrel simultaneously through the medium of the pinion 110 and the gears 112 and 114, thereby changing the focusing adjustment of the associated telescope. Since the latter telescope is not being used for sighting purposes, any out-of-focus condition of its optical system will offer no visual discomfort to the user (whose eye is closed) during this initial adjustment procedure. When the desired focusing adjustment of the one objective barrel is completed, any out-of-focus condition which obtains in the optical system which is associated with such other objective barrel may be remedied by holding the already focused objective barrel stationary and rotating the other objective barrel while sighting through the telescope having said other objective barrel, to the exclusion of the first and initially focused telescope, until both telescopes are correlated insofar as their focusing adjustments are concerned. In carrying out this focusing procedure, it is not essential that the user shall initially rotate the particular objective barrel which he or she is using for this initial sighting phase of binocular adjustment. The user, if he or she finds it more convenient, may rotate the objective barrel 18 which is not being used for initial sighting purposes since rotation of either objective barrel 18 will drivingly effect commensurate rotation of the other objective barrel. During that phase of the focusing procedure wherein one objective barrel is held stationary while the other objective barrel is rotated, the procedure wherein one objective barrel is held stationary while the other objective barrel is rotated, the gear ring 112 or 114 (as the case may be) which encompasses the stationary objective barrel, will slip within the groove which is defined for it by the associated shoulder 118 and the friction nut 116. It is contemplated that during assembly of the binocular 10 at the factory, the friction nuts 116 will be adjusted for an optimum condition of friction and then permanently bonded in their adjusted positions. After both telescopes 12 and 14 of the binocular have been correlated with the respective refractions of both eyes of the user, focusing of both telescopes for the viewing of objects near or far may be effected by simply rotating either objective barrel 18 with the assurance that the other barrel will be commensurately rotated.

It is to be noted that during rotation of either objective barrel 18 to the exclusion of the other barrel, the consequent axial displacement of the rotated barrel, with respect to the other or stationary barrel will cause the associated gear ring 112 or 114 (as the case may be) to slide on the pinion 110 so that there will be no danger of mis-mating of gears or gear separation. Thus, regardless of the particular longitudinal positions of the two objective barrels 18, a frictional driving relationship will at all times obtain between these barrels.

It is to be further noted that when the binocular 10 is in use, regardless of whether the same be hand-held or worn by means of the eyepiece and nosepiece assemblies 120 and 122, only the eyepiece barrels 16 are in front of the eyes and these are of extremely small size despite the use of lens elements of the wide angle Erfle type. The various mirrors M1, M2, M3 and M4 so fold the optical system as to place the relatively bulky objective barrels 18 out of sight of the viewer and immediately in front of the forehead in close proximity to the latter. Thus, only the relatively small-diameter eyepiece barrels 16 are in front of the eyes and such barrels are of the smallest size possible consistent with any eyepiece having an angular field of the order of 64°. The first lenses L6 of the eyepiece barrels 16 are mounted at the apices or small bases of the frusto-conical outer or front ends 61 of the casings 54 of the eyepiece barrels with only an extremely thin aperture rim. Thus, the user's eyes see both through the instrument, as well as around it, thereby creating what may be termed a bifocal effect without the dark or opaque framing circle which is common to conventional or standard binoculars. By reason of the aforementioned frusto-conical outer or front ends of the eyepiece barrels 16, clearance is provided for direct visual sighting beneath the binocular 10 when the user tilts his or her head upwardly a few degrees.

The invention is not to be limited to the exact arrangement of parts shown in the accompanying drawings or described in this specification as various changes in the details of construction may be resorted to without departing from the spirit or scope of the invention. For example, although the invention has specifically been illustrated and described herein in connection with a binocular, it is within the scope of the present invention to embody the principles and structural features thereof in other optical instruments as, for example, in a telescope or other monocular instrument. Therefore, only insofar as the invention is particularly pointed out in the accompanying claims is the same to be limited.

Having thus described the invention, what I claim as new and desire to secure by Letters Patent is:

1. A binocular comprising two telescopes hingedly connected together for swinging movement toward and away from each other, each telescope embodying upper and lower generally frusto-conical tubular shell portions which have their axes positioned at a right angle to each other and are arranged with the small base of the upper shell portion intersecting the small base of the lower shell portion in offset relationship, the large base of each shell portion having extending thereacross a horseshoe-shaped planar mirror with an arched rim section and a straight rim section, the small base of each shell portion likewise having extending thereacross a similar horseshoe-shaped planar mirror with an arched rim section and a straight rim section, the planes of the mirrors at the large bases of the shell portions extending at an angle of approximately 45° to each other, the planes of the mirrors at the opposite ends of each shell portion extending at a right angle to each other, the arched rim sections of the horseshoe-shaped mirrors at the small bases of the shell portions being approximately tangential, the straight rim sections of the horseshoe-shaped mirrors at the ends of the upper shell portion being disposed in close opposed parallel relation, the straight rim sections of the horseshoe-shaped mirrors at the ends of the lower shell portion being in opposed parallel relation and disposed apart a distance substantially greater than the distance between the straight rim sections of the horseshoe-shaped mirrors at the ends of the upper shell portion, the large base of the upper shell portion being provided with a circular objective aperture in opposed relation with the adjacent horseshoe-shaped mirror therein, the large base of the lower shell portion being provided with a circular eyepiece aperture in opposed relation with the adjacent horseshoe-shaped mirror therein, the planes of said objective and eyepiece apertures each extending at an angle of approximately 45° to the plane of the adjacent mirror, and being disposed in close parallelism, a lens-containing objective barrel seated within said objective aperture and extending closely alongside of one pair of right angularly disposed mirrors, and a lens-containing eyepiece barrel seated within said eyepiece aperture and extending closely alongside of another pair of right angularly disposed mirrors, the upper and lower shell portions of each telescope being of such size or proportion that the mirrors at the small bases thereof are disposed without overlap in the direction of the line of sight and the mirrors at their large bases overlap only slightly in the direction of the line of sight to the end that the linear distance between the outer remote surfaces of the eyepiece and objective lenses of each telescope is less than one-half the extreme width of the binocular when the two telescopes of the latter are swung apart to their fullest extent, the four mirrors of each telescope being arranged in Porro-type relation.

2. A binocular comprising two telescopes hingedly connected together for swinging movement towards and away from each other for interpupillary adjustment, said telescopes telescopies embodying unitary shells and having juxtapositioned complemental hinge lugs on adjacent portions thereof, a hinge pin projecting through said hinge lugs and forming with the latter the hinge connection between said telescopes, each telescope shell having upper and lower generally frusto-conical tubular shell portions which have their axes positioned at right angles to each other and are arranged with the small base of the lower shell portion intersecting the small base of the upper shell portion in offset relationship, the small base of each shell portion being provided with a horseshoe-shaped seating aperture defining an arched rim section and a straight rim section, the large base of each shell protion likewise being provided with a similar horseshoe-shaped seating aperture with an arched rim section and a straight rim section, the planes of the horseshoe-shaped apertures at the large bases of the shell portions extending at an angle of approximately 45° to each other and the planes of the horseshoe-shaped apertures at the opposite ends of each shell portion extending at right angles to each other, the straight rim sections of the horseshoe-shaped apertures of each shell portion extending in opposed parallel relation, the arched rim sections of the apertures of the small bases of the two shell portions of each shell being approximately tangential, the large base of the upper shell portion of each shell being provided with an internally-threaded circular objective aperture in opposed relation with the adjacent horseshoe-shaped aperture therein and the plane of which extends at an angle of approximately 45° to the plane of said adjacent horseshoe-shaped aperture, the large base of the lower shell portion of each shell portion being provided with an eyepiece aperture in opposed relation with the adjacent horseshoe-shaped aperture and the plane of which extends at an angle of approximately 45° to the plane of said adjacent horseshoe-shaped aperture, the circular aperture and the arched rim section of the adjacent horseshoe-shaped aperture of the shell of each telescope being approximately tangential, the horseshoe-shaped aperture at the small base of each lower shell portion being positioned alongside of and in close proximity to the associated objective aperture, the horseshoe-shaped aperture at the small base of each upper shell portion being disposed alongside of and in close proximity to the associated eyepiece aperture, a commensurately-shaped planar mirror seated within each horseshoe-shaped aperture of the shell portions of each shell, a lens-containing eyepiece barrel mounted within each eyepiece aperture, and a lens-containing objective barrel threadedly received within each objective aperture and axially shiftable therein upon rotation thereof, the upper and lower shell portions of each shell being of such size or proportion that the mirrors at the small bases thereof are disposed without overlap in the direction of the line of sight and the mirrors at their large bases overlap only slightly in the direction of the line of sight to the end that the linear distance between the outer remote surfaces of the eyepiece and the objective lens of each telescope is less than one-half the extreme width of the binocular when the telescopes of the latter are swung apart to their fullest extent, the four mirrors of each telescope being arranged in Porro-type relation.

3. A binocular comprising two telescopes hingedly connected for swinging movements toward and away from each other for interpupillary adjustment, said telescopes embodying unitary shells and having juxtapositioned complemental hinge lugs on adjacent portions thereof, a hinge pin projecting through said hinge lugs, said hinge pin and lugs constituting the hinge connection between said telescopes, each shell having upper and lower generally frusto-conical tubular shell portions whiich have their axes positioned at right angles to each other and are arranged with the small base of the lower shell portion intersecting the small base of the upper shell portion in offset relationship, the small base of each shell portion being provided with a horseshoe-shaped seating aperture defining an arched rim section and a straight rim section, the large base of each shell portion likewise being provided with a similar horseshoe-shaped seating aperture, the planes of the horseshoe-shaped aperture at the opposite ends of each shell portion extending at right angles to each other, the straight rim sections of the horseshoe-shaped apertures of each shell portion extending in close parallelism, the arched rim sections of the horseshoe-shaped apertures at the small bases of the two shell portions being approximately tangential, the large base of the upper shell portion being provided with an internally-threaded circular objective aperture the plane of which extends at an angle of approximately 45° to the plane of the adjacent horseshoe-shaped aperture, the large base of the lower shell portion being provided with a circular eyepiece aperture the plane of which extends at an angle of approximately 45° to the plane of the adjacent horseshoe-shaped aperture, a commensurately-shaped planar mirror seated within each horseshoe-shaped aperture, a lens-containing eyepiece barrel mounted within said eyepiece aperture, a lens-containing objective barrel threadedly received within said objective aperture and axially shiftable therein upon rotation thereof in one direction, and a gear ring encompassing said objective barrel and capable of both rotation and axial shifting thereon, a bushing mounted on said hinge pin and meshing with the gear rings of each telescope, an annular friction shoulder on the objective barrel of each telescope and in frictional engagement with the associated gear ring, a friction nut threadedly received on the objective barrel of each telescope and effective upon tightening thereof to force the adjacent gear ring against the associated friction shoulder to restrain rotation of the latter on the objective barrel and thus produce a variable friction-induced slip connection between the gear ring and objective barrel whereby manual rotation of the one objective barrel will effect a commensurate rotation of the other objective barrel for binocular center focusing purposes, and whereby individual focusing may be attained by restraining rotation of either objective barrel while rotating the other objective barrel.

4. A binocular as set forth in claim 3 and wherein the circular aperture and the arched rim sections of the adjacent horseshoe-shaped aperture of the shell of each telescope are approximately tangential.

5. A binocular as set forth in claim 4 and wherein the linear distance between the outer remote surfaces of the eyepiece and objective lenses of each telescope is less than one-half the extreme width of the binocular when the telescopes of the latter are fully swung apart.

6. A binocular as set forth in claim 3 and wherein the horseshoe-shaped aperture at the small base of each lower shell portion is positioned alongside of and in close proximity to the associated objective aperture.

7. A binocular as set forth in claim 3 and wherein the horseshoe-shaped aperture at the small base of each upper shell portion is disposed alongside of and in close proximity to the associated eyepiece aperture.

8. A binocular as set forth in claim 3 and wherein the horseshoe-shaped aperture at the small base of each lower shell portion is positioned alongside of and in close proximity to the associated objective aperture and the horseshoe-shaped aperture at the small base of each upper shell portion is disposed alongside of and in close proximity to the associated eyepiece aperture.

9. A binocular comprising two telescopes hingedly connected together for swinging movement toward and away from each other, each telescope embodying upper and lower generally frusto-conical tubular shell portions which have their axes positioned at a right angle to each other and are arranged with the small base of the upper shell portion intersecting the small base of the lower shell portion in offset relationship, the large base of each shell portion having extending thereacross a planar mirror with one section of its rim straight, the small base of each shell portion likewise having extending thereacross a similar planar mirror with one section of its rim straight, the planes of the mirrors at the large bases of the shell portions extending at an angle of approximately 45° to each other, the planes of the mirrors at the opposite ends of each shell portion extending at a right angle to each other, the mirrors at the small bases of the shell portions having the sections of the rims thereof that are opposite to the straight sections positioned in close proximity to one another, the straight rim sections of the mirrors at the ends of the upper shell portion being disposed in close opposed parallel relation, the straight rim sections of the mirrors at the ends of the lower shell portion being disposed in close opposed parallel relation and disposed apart a distance substantially greater than the distance between the straight rim sections of the mirrors at the ends of the upper shell portion, the large base of the upper shell portion being provided with a circular objective aperture in opposed relation with the adjacent mirror therein, the large base of the lower shell portion being provided with a circular eyepiece aperture in opposed relation with the adjacent mirror therein, the planes of said objective and eyepiece apertures extending each at an angle of approximately 45° to the plane of the adjacent mirror, and being in comparatively close parallelism, a lens-containing objective barrel seated within said objective aperture and extending alongside of one pair of right angularly disposed mirrors, and a lens-containing eyepiece barrel seated within said eyepiece aperture and extending alongside of another pair of right angularly disposed mirrors, the upper and lower shell portions of each telescope being of such size or proportion that the mirrors at the small bases thereof are disposed without overlap in the direction of the line of sight and the mirrors at their large bases overlap only slightly in the direction of the line of sight in order that the linear distance between the outer remote surfaces of the eyepiece and objective lens of each telescope is less than one-half the extreme width of the binocular when the two telescopes of the latter are swung apart to their fullest extent, the four mirrors of each telescope being arranged in Porro-type relation.

10. A binocular comprising two telescopes hingedly connected together for swinging movements toward and away from each other for interpupillary adjustment, said telescopes embodying unitary shells and having juxtapositioned complemental hinge lugs on adjacent portions thereof, a hinge pin projecting through said hinge lugs, said hinge pin and lugs constituting the hinge connection between said telescopes, each shell having upper and lower generally frusto-conical tubular shell portions which have their axes positioned at right angles to each other and are arranged with the small base of the lower base portion intersecting the small base of the upper shell portion in offset relationship, the small base of each shell portion being provided with a seating aperture having a section of its rim straight, the large base of each shell portion likewise being provided with a similar seating aperture with a section of its rim straight, the planes of the apertures at the opposite ends of the shell portions extending at right angles to each other, the straight rim sections of the apertures of each shell portion extending in close parallelism, the apertures at the small bases of the two shell portions having the sections of the rims thereof opposite to the straight sections in close proximity to one another, the large base of the upper shell portion being provided with an internally threaded circular objective aperture the plane of which extends at an angle of approximately 45° to the plane of the adjacent horseshoe-shaped aperture, the large base of the lower shell portion being provided with a circular eyepiece aperture the plane of which extends at an angle of 45° to the plane of the adjacent seating aperture, a commensurately-shaped planar mirror seated within each aperture, a lens-containing eyepiece barrel mounted within said eyepiece aperture, a lens-containing objective barrel threadedly received within said objective aperture and axially shiftable therein upon rotation thereof in one direction, and a gear ring encompassing said objective barrel and capable of both rotation and axial shifting thereon, a bushing mounted on said hinge pin and meshing with the gear rings of each telescope, an annular friction shoulder on the objective barrel of each telescope and in frictional engagement with the associated gear ring, a friction nut threadedly received on the objective barrel of each telescope and effective upon tightening thereof to force the adjacent gear ring against the associated friction shoulder to restrain rotation of the latter on the objective barrel and thus produce a variable friction-induced slip connection between the gear ring and objective barrel whereby manual rotation of the one objective barrel with effect a commensurate rotation of the other objective barrel for binocular center focusing purposes, and whereby individual focusing may be attained by restraining rotation of either objective barrel while rotating the other objective barrel.

* * * * *